United States Patent

[11] 3,564,992

| [72] | Inventor | Charles C. Sattes<br>26108 Elderswood Place, Hemet, Calif. 92343 |
|---|---|---|
| [21] | Appl. No. | 871,751 |
| [22] | Filed | Oct. 27, 1969 |
| [45] | Patented | Feb. 23, 1971<br>Continuation of application Ser. No. 728,609, May 13, 1968, now abandoned. |

[54] VERTICAL MEAT BROILER
2 Claims, 6 Drawing Figs.

[52] U.S. Cl. .................................................. 99/391,
99/393, 99/400, 99/402, 219/415
[51] Int. Cl. ...................................................... A47j 37/04
[50] Field of Search............................................ 219/403,
415, 416, 417, 418, 419, 523; 99/339, 385, 389,
390, 391, 393, 394, 400, 402

[56] References Cited
UNITED STATES PATENTS

| 1,533,241 | 4/1925 | Forshee................. | (99/385UX) |
| 1,543,362 | 6/1925 | Boletino................ | 99/391 |
| 1,733,137 | 10/1929 | Spang.................... | 99/402X |
| 1,809,172 | 6/1931 | Le Sauvage ............. | 99/444X |
| 2,030,047 | 2/1936 | Bonzagni et al. ........ | 99/339 |
| 2,181,204 | 11/1939 | Ricard.................... | 99/392 |
| 2,941,463 | 6/1960 | DiCuia.................. | 99/402X |
| 2,962,957 | 12/1960 | Bork..................... | 99/402 |
| 3,052,177 | 9/1962 | Lombardo................ | 99/390 |
| 3,094,061 | 6/1963 | Cole..................... | 99/402 |
| 3,395,267 | 7/1968 | Mackay................... | 219/403X |

*Primary Examiner*—Billy J. Wilhite

ABSTRACT: Apparatus for broiling meat comprising a housing having an inner surfaced removable electrical element and removable longitudinally apertured top and closed base portions; the top having supporting means for dual handled rods swingably carrying dual meat holding grids loosely connected at their bottom edges.

PATENTED FEB 23 1971

3,564,992

INVENTOR.
CHARLES C. SATTES
BY
LIONEL V. TEFFT
Attorney

VERTICAL MEAT BROILER

This application is a continuation of application Ser. No. 728,609, filed May 13, 1968 and now abandoned.

One of the objects of the invention is in the provision of a vertical type electrical broiler unit supporting a manually detachable meat holding grid.

Another object of the invention lies in the construction of a unit for quick disassembly for cleaning.

Yet another object of the invention is in the provision of a unitary vertical broiler in which a manually actuated handled rod device supports the meat elements for quick broiling and easy removal.

The fundamental theory of applicant's device is to produce a simple vertical type electrical broiler unit that can be completely disassembled for cleaning. It can be transported as desired, the meat elements placed in a special removable handled grid and then disposed in the unit for easy inspection and quick broiling. The drippings are caught in the base for use as desired. The unit is arranged for quick cleaning.

These and other objects and advantages of the present invention will become apparent to those skilled in the art upon consideration of the following detailed description of the preferred embodiment thereof, reference being made to the accompanying drawings, herewith, wherein.

Figure 1:
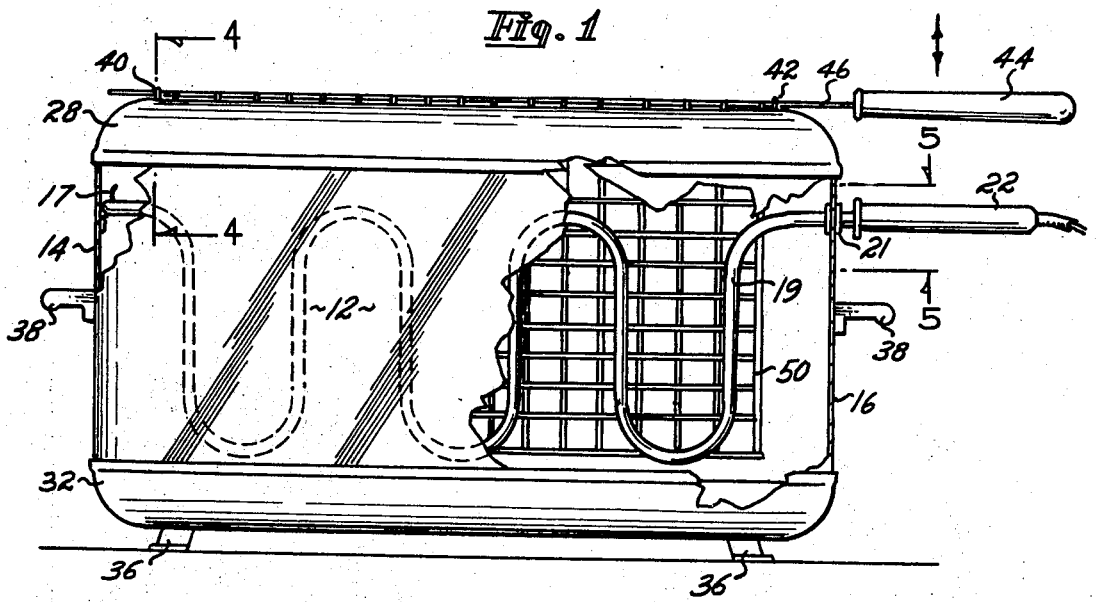
FIG. 1 is an elevational view partially cutaway of the device.
Figure 2:
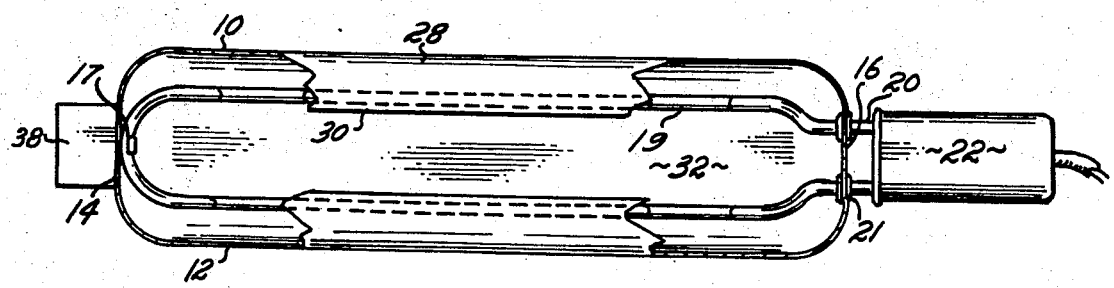
FIG. 2 is a plan view of the device with the meat holder removed.
Figure 3:
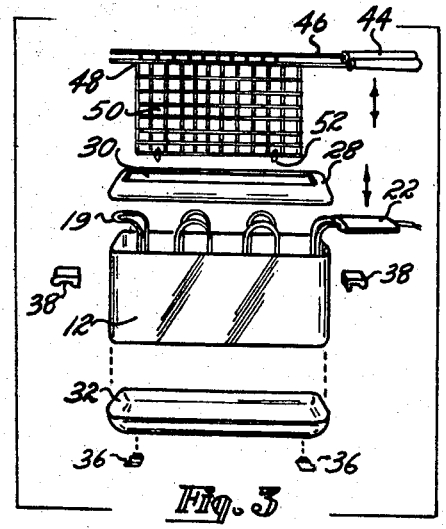
FIG. 3 is a schematic view of the broiler.
Figure 4:
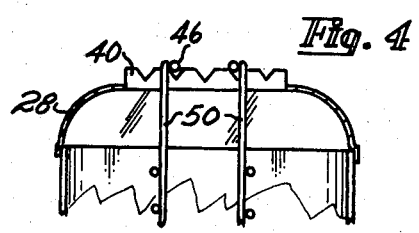
FIG. 4 is a view taken on the line 4-4 of FIG. 1.
Figure 5:
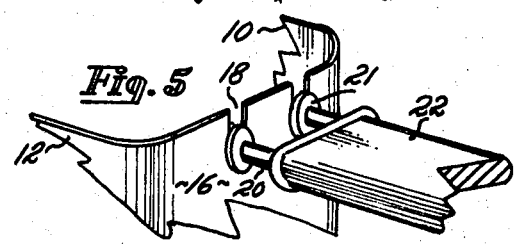
FIG. 5 is a view taken on the line 5-5 of FIG. 1.

The drawings disclose a preferred embodiment of the invention. An elongated open topped side section 10 and 12 is closed by the relatively narrow ends 14 and 16, respectively. This may be an encircling sheet of suitable metal. Supported by a clip 17 and dual slots 18 is a quick detachable electrical heating element 19 spaced from the sides and end portions. The heating element may take various forms suitable for the occasion. The projecting ends 20 grommeted at 21 of the heating element 19 contained in a handle 22 that forms the connection with the conventional electrical cord.

A top 28 apertured longitudinally at 30 actually forms a detachable cover for the sides and ends. A similarly formed detachable bottom or base 32 forms a drip pan. The base 32 is elevated and sustained by plural feet 36 attached to or stamped from the base. Broiler lifting short arms 38 are attached to the ends 14 and 16. The device as heretofore described is easily cleaned by part detachment. The top, base and electrical unit are quickly separated.

Figure 6:
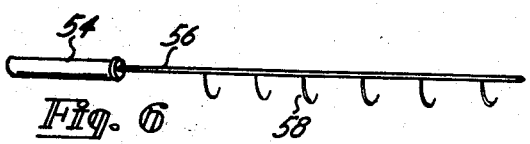
FIG. 6 is a view of a modified meat holder.

At either end of the cover 28 and adjacent the opening 30 are positioned plural notched 40 supports 42 for a manually actuated meat holder comprising the following parts. Dual handles 44 are attached to rods 46 that rest in the notches 40 at either end. Swinging at 48 from the rods 46 are a pair of reticulated grids 50 loosely connected at their bottom edges by rings 52 or other type of grid spacing members. Another type of meat hook or hanger is shown in FIG. 6. In this modification, there is a single handled 54 and 56 which has multiple meat hooks 58 thereon.

The operation of the device is believed clear. The steaks, hamburger or other meats are placed in the expandible grid and hung in vertical position between the electrical heating elements. Drippings during the broiling operation are caught in the base. The broiling meat is easily raised for inspection or complete withdrawal in a simple and easy manner. Separation of the elements for cleaning has been described.

I claim:

1. A vertical electric meat broiling appliance comprising:
a broiler housing, embodying a permanently united structure, including
two end walls and two longitudinal walls connecting said end walls, said structure surrounding and defining a broiling space to which access may be had for cleaning purposes through opposite access openings in said structure defined by free edges of said end walls and said longitudinal walls,
said housing also including covers for said access openings which are subject to ready assembly with said structure to at least partially cover said access openings and are readily displaceable from said access openings;
an electric broiling element supported on said structure and normally disposed within said broiling space, said element being readily displaceable, without the use of tools, from said broiling space through one of said access openings when the latter is uncovered, to facilitate access to said broiling space for cleaning purposes; and
means for introducing meat to be broiled into said broiling space in juxtaposed relation with said electric element, said means including a slot provided in said housing, and
meat carrying grid means adapted to be supported on said housing after being employed to introduce said meat through said slot and into said broiling space.

2. A meat broiling appliance as recited in claim 1 wherein:
said two longitudinal walls are disposed vertically and said access openings open upwardly and downwardly from said broiling space; and wherein
said covers include a base for said appliance constituting a pan for collecting drippings gravitating from said meat and said upper cover contains the slot aforementioned as provided in said housing for introducing meat into said broiling space; and
said upper cover is removed to uncover the upper access opening in said housing for displacing the electric broiling element upwardly from said housing.